United States Patent
Bernhard et al.

(10) Patent No.: US 8,539,849 B2
(45) Date of Patent: Sep. 24, 2013

(54) BEARING SYSTEM FOR A WORM IN A STEERING GEAR

(75) Inventors: Werner Bernhard, Moegglingen (DE); Marco Grau, Schwaebisch Gmuend (DE); Ekkehard Kneer, Wendlingen (DE); Jens-Uwe Hafermalz, Waeschenbeuren (DE); Dennis Fuechsel, Schwaebisch Gmuend (DE); Juergen Bieber, Pluederhausen (DE); Rainer Schaenzel, Essingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/373,080

(22) Filed: Nov. 3, 2011

(65) Prior Publication Data

US 2012/0125132 A1    May 24, 2012

Related U.S. Application Data

(63) Continuation of application No. PCT/EP2010/054291, filed on Mar. 31, 2010.

(30) Foreign Application Priority Data

May 8, 2009  (DE) .................. 10 2009 002 940

(51) Int. Cl.
*F16H 1/16* (2006.01)
*F16H 1/20* (2006.01)
*F16H 35/00* (2006.01)
*F16C 23/04* (2006.01)
*F16C 23/08* (2006.01)
*F16C 33/56* (2006.01)

(52) U.S. Cl.
USPC ........... 74/388 PS; 74/425; 384/498; 384/518

(58) Field of Classification Search
USPC ..... 74/388 PS, 425, 427; 180/444; 384/495, 384/496, 497, 498, 517, 518
See application file for complete search history.

(56) References Cited

U.S. PATENT DOCUMENTS

| 3,425,239 | A | * | 2/1969 | Baier ............................ 464/27 |
| 6,357,313 | B1 | | 3/2002 | Appleyard |
| 6,412,591 | B1 | * | 7/2002 | Endo et al. ................... 180/427 |
| 6,708,796 | B2 | * | 3/2004 | Kinme et al. ................ 180/444 |

(Continued)

FOREIGN PATENT DOCUMENTS

| DE | 101 61 715 | 6/2003 |
| DE | 698 33 768 | 11/2006 |

(Continued)

*Primary Examiner* — Justin Krause
(74) *Attorney, Agent, or Firm* — Jordan and Hamburg LLP

(57) ABSTRACT

Disclosed is a bearing system for a worm engaging with a worm wheel as part of a steering gear, wherein the bearing system comprises at least one bearing with an outer ring, an inner ring, and rolling bodies that are movably accommodated between the outer an inner rings, the bearing being pivotally arranged in a bearing seat for accommodating the outer ring of the bearing, and wherein the inner ring accommodates one of the two shaft ends of the worm in order to seat said shaft end of the worm radially in the housing of the steering gear. For an improved dampening of the worm at least one spring element, which exerts a spring force on a region of the outer ring of the bearing, is provided at the bearing, said spring force supporting a pivotal motion of the worm toward the worm wheel.

13 Claims, 4 Drawing Sheets

(56) References Cited

U.S. PATENT DOCUMENTS

| | | | |
|---|---|---|---|
| 6,860,829 B2 * | 3/2005 | Bock et al. | 475/18 |
| 7,048,088 B2 | 5/2006 | Bernhard et al. | |
| 2004/0149512 A1 | 8/2004 | Tsutsui et al. | |
| 2004/0222036 A1 | 11/2004 | Berhard et al. | |

FOREIGN PATENT DOCUMENTS

| | | |
|---|---|---|
| DE | 10 2006 039 740 | 2/2008 |
| EP | 1 225 116 | 7/2002 |
| WO | WO-99/11502 | 3/1999 |

2008/0006472 A1 * 1/2008 Song et al. .................... 180/444

* cited by examiner

BEARING SYSTEM FOR A WORM IN A STEERING GEAR

BACKGROUND OF THE INVENTION

The invention relates to the mounting of a worm in a steering gear and to a corresponding steering gear and a power steering system equipped therewith according to the preamble of one of the independent claims.

The invention relates in particular to the mounting of a worm by means of a floating bearing and a fixed bearing, wherein the fixed bearing is designed as a pivot bearing and a spring load is provided to the worm.

A mounting of the type mentioned above is known from DE 101 61 715 A1. There, a first bearing (fixed bearing) is provided at the shaft end of the worm which is connected to the drive shaft of a servo motor (electric motor), the bearing being in turn again pivotably mounted and thus designed in the manner of a pivot bearing. A second bearing (floating bearing) is provided at the other, free shaft end of the worm. The worm is thus radially secured, yet is able to expand in the axial direction and can always securely mesh with a worm gear as a result of the pivot bearing. The pivot bearing thus makes it possible for the worm to be mounted so as to be easily pivoted in the meshing direction toward the worm gear. FIG. 1 shows this known design, which is to say a steering gear 1 designed as a worm gear mechanism. For this purpose, the worm 3 and a worm gear 4 are disposed in the housing 2, wherein the worm meshes with the worm gear and is connected by means of a coupling 8 to the drive shaft 9 of an electric drive motor 10 which is mounted in a bearing 11. The worm shaft as such is mounted in a shaft mounting 5, which comprises a ball bearing 6 in the form of a four-point bearing and is designed as a swivel or pivot bearing. So as to keep the toothing play between the worm 3 and worm gear 4 constant to as great an extent as possible during the entire service life of the gear system, a preloading force is applied radially to the worm 3 and the worm is permanently pressed against the toothing of the worm gear 4 or worm wheel. This is done by means of a preloading device comprising a preloading spring 13 and a pressure device 12. The pressure device 12 can be provided, for example, with a hydraulic device 14 and a pressure piece 15 actuated thereby, the pressure piece directly acting on the bearing 16 or the worm 3. While the wear developing over the service life can thus be automatically compensated for, it has been shown that noise may also occur on the shaft bearing 5, which can be eliminated through the use of an expensive specialty bearing only conditionally.

Other shaft mountings, notably fixed bearings, comprising ball bearings are also known, in which the outer ring of the ball bearing is received in a sliding bearing, or in which the inner ring of the ball bearing is received in what is known as silent bushings, whereby the shaft is likewise pivotably mounted. However, these solutions are complex to implement and have relatively large play, which in turn results in the development of noise, notably during load changes (alternating steering). Moreover, these shaft mountings are susceptible to temperature fluctuations and the service life thereof is not very long.

SUMMARY OF THE INVENTION

It is therefore the object of the invention to propose a mounting for a worm in a steering gear so that the aforementioned disadvantages are advantageously overcome. In particular, a design of a mounting is to be proposed that is cost-effective to implement and low-noise to as great an extent as possible, a steering gear provided therewith, and a power steering system equipped therewith.

The object is achieved by a mounting of a worm having the characteristics of claim 1. A spring element is provided for this purpose on a bearing of the worm, and more particularly on the fixed bearing, to apply a spring force to a region of the outer ring of the bearing so as to provide a spring load to the worm, this spring force supporting pivoting of the worm toward the worm gear. The spring element is designed, for example, as a tapered section retaining ring or spring washer, which comprises a protrusion or a lug pressing directly on the region of the outer ring of the bearing which is located opposite of the region of the worm that meshes with the worm gear.

In this way, a spring load acting axially on the pivotable mounting of the worm is created directly in the bearing (fixed bearing), allowing basically no play to occur and thereby effectively preventing the development of noise at the pivot bearing. By using a spring washer or the like, the spring load can be attained in a cost-effective and installation space-saving manner. The spring element used, however, can also be any other type of elastic element, such as a compression spring, for example, which exerts an axial spring force to one location of the outer ring.

The invention further proposes a steering gear comprising such a mounting and to a power steering system equipped therewith.

It is therefore advantageous if, according to a preferred embodiment, the spring element has an asymmetrical design, or is asymmetrically disposed in the housing of the steering gear, so as to act only on the one region of the outer ring of the bearing. In this way, unilateral application of force is very easy to implement, which effects or supports the pivoting of the worm toward the worm gear.

In a preferred embodiment, the spring element is designed as an annular spring element, and more particularly as a tapered section retaining ring having a protrusion, by way of which an axial spring force is exerted on the one region of the outer ring of the bearing.

In another preferred embodiment, the spring element is designed as a disk-shaped spring element, and more particularly as a spring washer having a protrusion or lug so as to exert an axial spring force to the one region of the outer ring of the bearing. The spring washer may also be provided with an adjusting screw.

If the spring element is designed, for example, as a tapered section retaining ring or spring washer, the protrusion acts on the region of the outer ring which is located opposite of the region of the worm that meshes with the worm gear. The axially generated spring force thus produces a tilting or pivoting moment, which pivots the worm toward the worm gear.

In a further preferred embodiment, the spring element is designed as a compression spring that is asymmetrically disposed in the housing of the steering gear, and more particularly as a helical compression spring. This spring may be provided with a pressure tip. The compression spring is disposed in the region of the outer ring which is located opposite of the region of the worm that meshes with the worm gear. The axially generated spring force thus produces a tilting or pivoting moment, which pivots the worm toward the worm gear.

Advantageously, the mounting may also comprise a combination of several such spring elements.

In the mounting proposed here, the mounting seat receiving the outer ring can be designed as a pivot ring, wherein the spring element (for example, spring washer) applies an axially acting force to the outer ring and pushes it against the pivot ring. This design is preferably provided in the steering gear on the fixed bearing of the worm, which is to say where the inner ring receives the driven shaft end of the worm which is connected to a servo drive. The spring element deliberately presses onto a region of the outer ring in the axial direction, preferably by means of a protrusion or a lug. The pivot ring has a concave sliding surface, and the outer ring has a matching convex sliding surface, so that the unilateral force stemming from the spring element effects a pivoting of the worm or worm shaft toward the worm gear.

The invention and the resulting advantages will be described in detail hereafter based on exemplary embodiments, with reference being made to the following schematic drawings:

DESCRIPTION OF THE PREFERRED EMBODIMENTS

Figure 2:
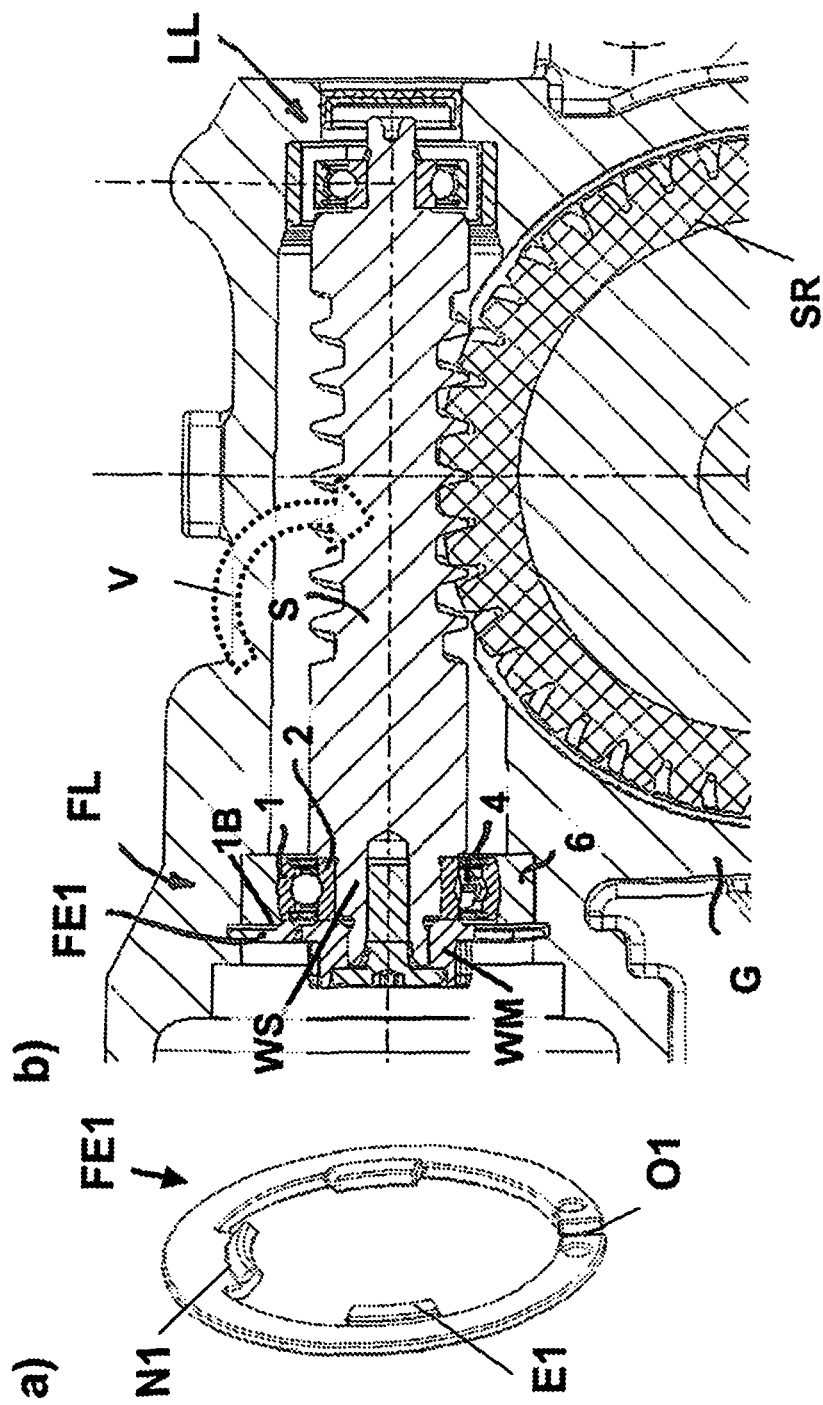
FIGS. 2a and 2b show a first embodiment of the mounting according to the invention, in which the spring element is designed as a tapered section retaining ring.

FIG. 2 comprises the sub-FIGS. 2a and 2b, which show a mounting according to the invention in a first embodiment.

FIG. 2a shows a spring element FE1, which is designed as a tapered section retaining ring and used in the steering gear shown in FIG. 2b for providing a spring load to the worm and, for this purpose, is used directly on one of the bearings, which is to say on the fixed bearing. The spring element FE1, or the tapered section retaining ring, comprises a protrusion N1 which in the installed state acts directly on the outer ring 1 of the fixed bearing FL (see FIG. 2b). In addition, the tapered section retaining ring has an opening 01 and retaining elements E1. The retaining elements E1 do not act on the outer ring 1, and instead act on the pivot ring 6, thus serving notably the fixation of the tapered section retaining ring FE1.

Figure 1:
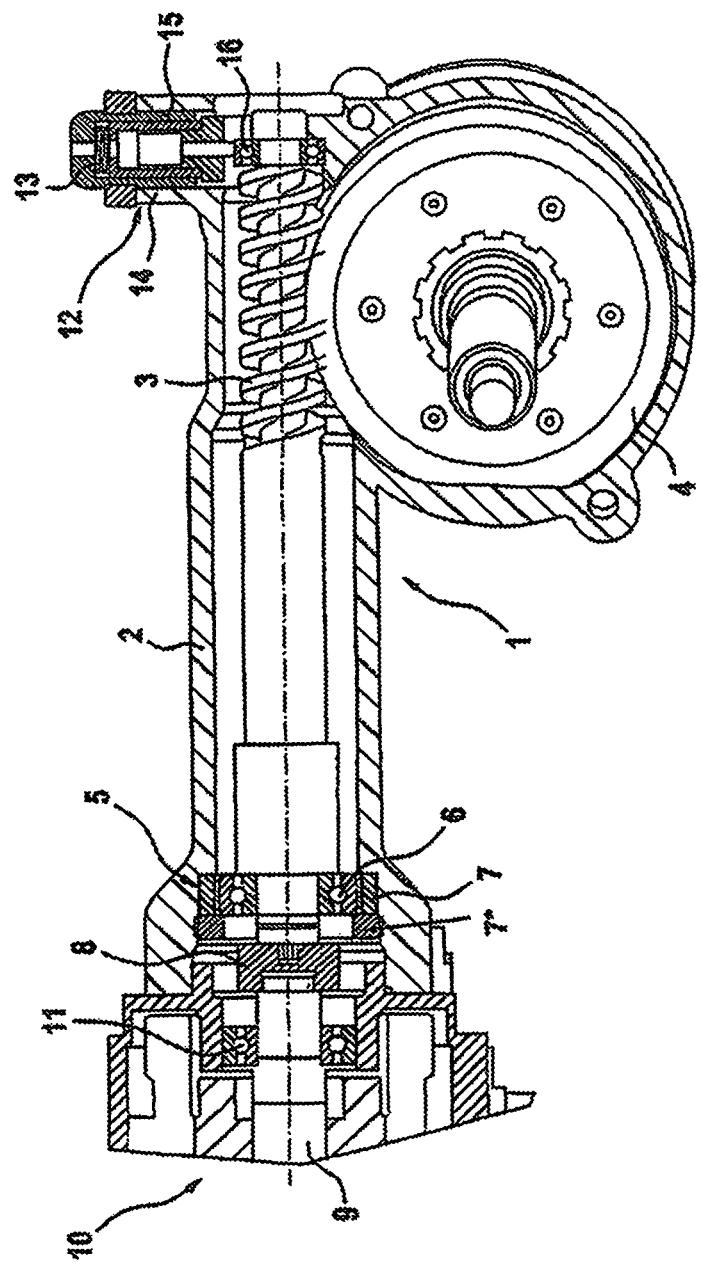
FIG. 1 shows a conventional mounting in the form of a pivot bearing.

As FIG. 2b shows in a schematic illustration, a worm S is mounted at the two shaft ends thereof in the housing G of the steering gear, wherein the drive-side shaft end is radially mounted in a fixed bearing FL and the free shaft end in a floating bearing. The worm S meshes with a worm gear SR. So as to improve the meshing and provide a spring load to the worm S, a spring element is disposed on the fixed bearing FL, which were is also the tapered section retaining ring FE1 shown in FIG. 1a.

The fixed bearing FL shown in FIG. 2b corresponds to a pivot bearing, which substantially comprises an outer ring 1, an inner ring 2, and rolling bodies 4, in the form of balls, received movably between the rings. A bearing seat, which is designed in the form of a pivot ring 6 having a convex sliding surface, in turn receives the outer ring 1, the outside surface of which is concave. The inner ring 2 in turn receives the shaft end WS (here the left one) of the worm S which is connected to the servo motor (not shown in detail). The pivot bearing thus created makes it possible for the worm S to be mounted so as to be easily pivoted in the meshing direction toward the worm gear SR. The floating bearing LL located at the other, free shaft end of the worm S (here on the right side) merely effects radial mounting of this shaft end. So as to enable pivoting V of the worm S, the floating bearing LL is disposed such that a corresponding moving option in the radial direction toward the worm gear SR, and vice versa, is possible. For this purpose, an elongated hole seat of the floating bearing LL or the like can be provided, for example.

So as to suppress the axial play inside this pivoting slot, and notably so as to effectively counteract noise development that occurs during load changes, the spring element FE1 is installed on the pivot bearing (fixed bearing) FL and provides an axial spring load to a certain region of the outer ring 1, here at a force that is directed to the right.

As is shown in FIG. 2b, the spring element FE1 designed as a tapered section retaining ring is installed between the pivot ring 6 and a fastening threaded ring BS, wherein the lug-shaped protrusion N1 (see FIG. 2a) presses directly on the region 1B of the outer ring 1 which is located opposite of the region of the worm S that meshes with the worm gear SR. The axial spring force is thus converted to a pivoting moment, which pivots the worm S toward the worm gear SR (see rotary arrow V in FIG. 2b). Noise-developing bearing play is thus prevented between the outer ring 1 and the pivot ring 6.

The lug N1 provided on the tapered section retaining ring FE1 first extends in the radial direction inward and is then angled in the axial direction (here to the right) in the region of the outer ring 1, or has an angled flank (taper), which in the installed state directly abuts the outer ring 1 in the region 1B, where it exerts the axial spring force.

On the outer circumference, the tapered section retaining ring FE1 is installed and braced between the pivot ring 6 and the housing G by means of a threaded ring or adjusting screw BS. As a result of the design shown here, the outer ring 1 is preloaded against the pivot ring 6, whereby no free play is allowed any longer and the noise development during operation of a power steering system equipped with the steering gear is thus significantly reduced.

Figure 3:
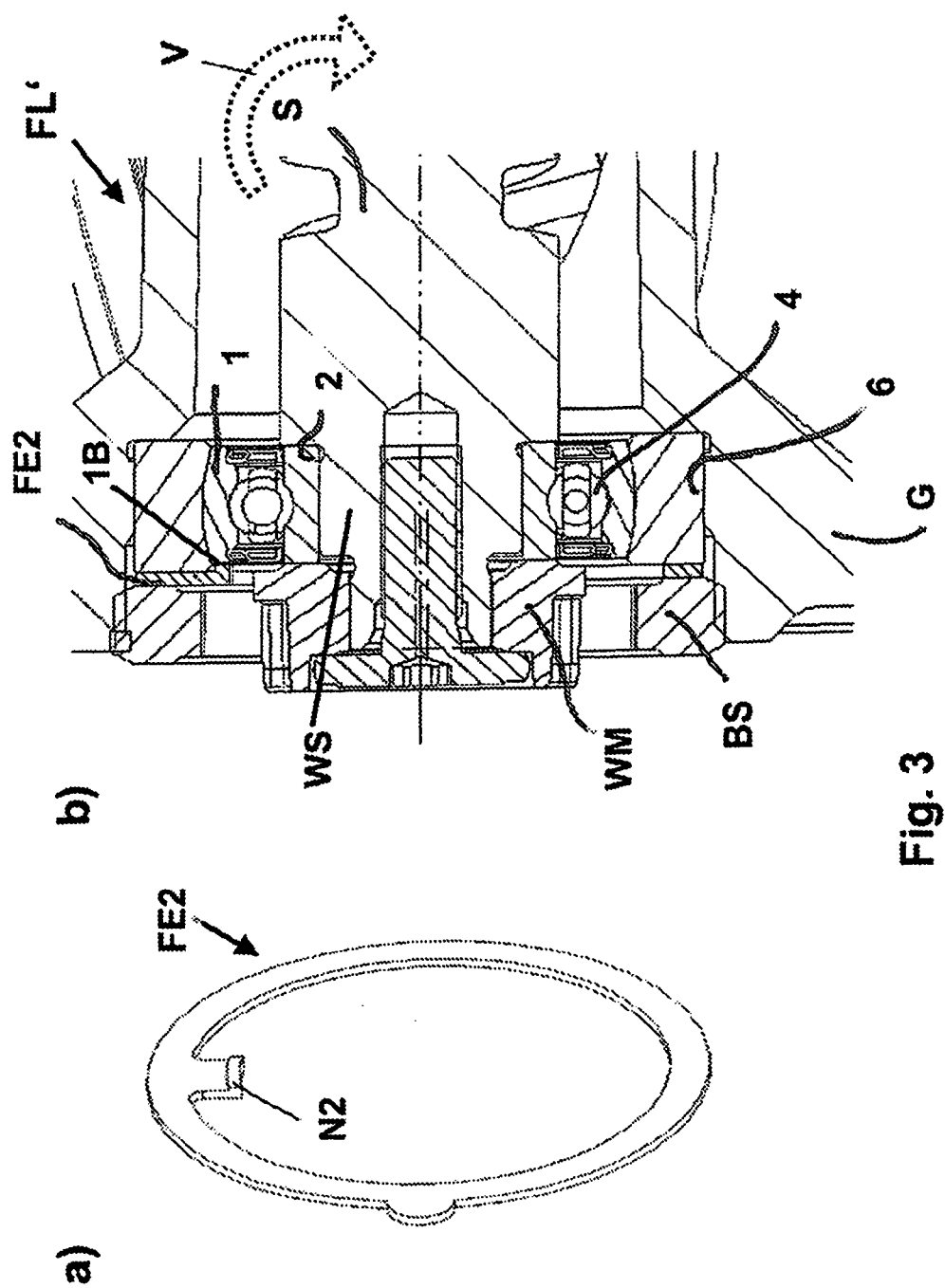
FIGS. 3a and 3b show a second embodiment of the mounting according to the invention, in which the spring element is designed as a spring washer.

FIG. 3 comprises the sub-FIGS. 3a and 3b, which show a mounting according to the invention in a second embodiment.

FIG. 3a shows a spring element in the form of a spring washer FE2, which is likewise used to provide a spring load to the worm (see FIG. 3b). The spring washer FE2 comprises a protrusion or a lug N2, which in the installed state acts directly on the one region 1B of the outer ring 1 of the fixed bearing FL (see FIG. 3b). The fixed bearing FL shown in FIG. 3b also corresponds to a pivot bearing, wherein now a spring load is provided to the mounting of the worm S by means of the spring washer FE2. Again, the lug-shaped protrusion N2 presses directly on the region 1B of the outer ring 1, this being the region located opposite of the region of the worm S that meshes with the worm gear SR. The axial spring force is thus again converted to a pivoting moment, which pivots the worm S toward the worm gear SR (see rotary arrow V in FIG. 3b).

Figure 4:
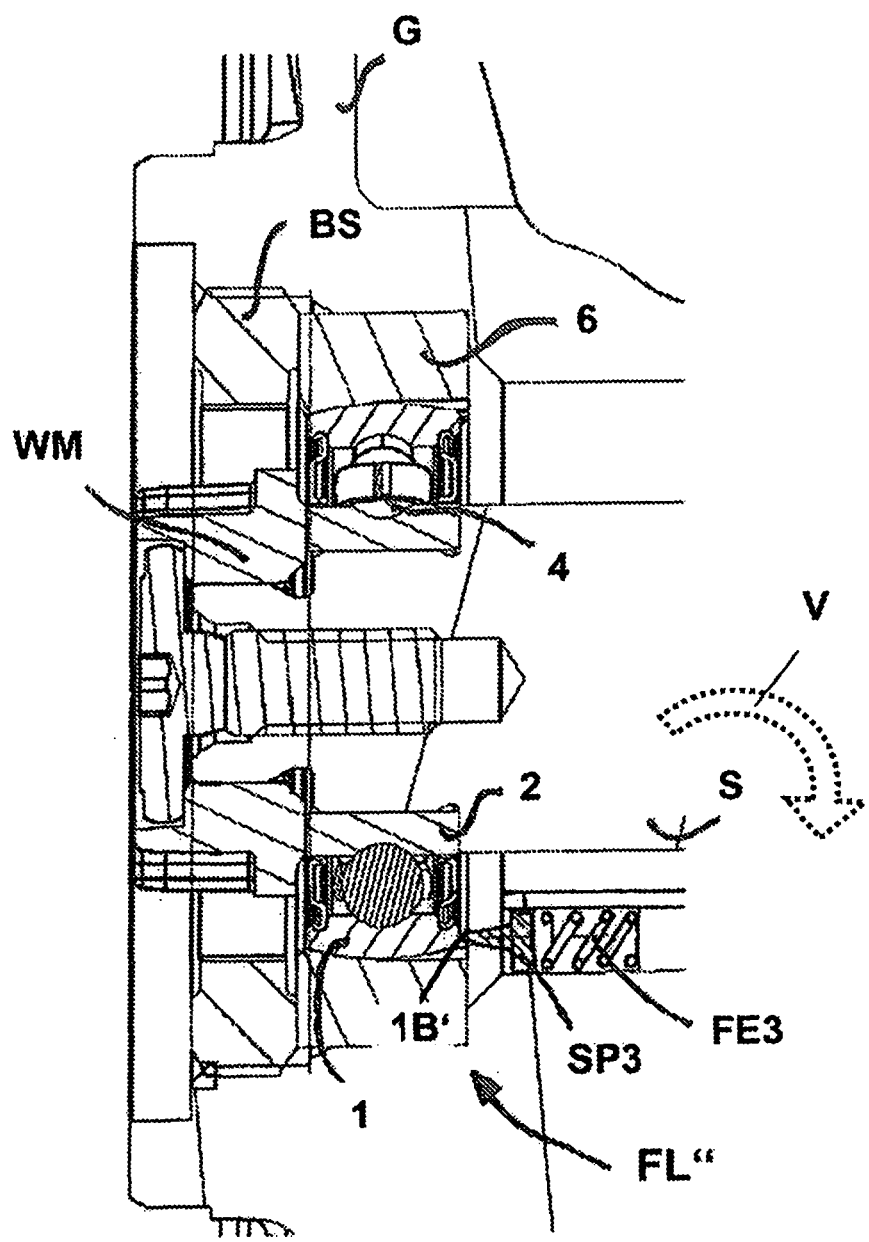
FIG. 4 show a third embodiment of the mounting according to the invention, in which the spring element is designed as a helical compression spring.

FIG. 4 shows another mounting according to the invention in a third embodiment. Here, providing a spring load to the mounting of the worm S is achieved by means of a spring element FE3 designed as a compression spring. The compression spring is a helical compression spring, which is installed asymmetrically or unilaterally in the housing G with respect to the outer ring 1, which is to say it is installed in the lower region. The compression spring FE3 is provided with a pressure tip SP3, which consequently presses on the region 1B' of the outer ring which faces the region of the worm S that meshes with the worm gear SR. The axial spring force is thus again converted to a pivoting moment, so that the worm S is pivoted toward the worm gear SR (see rotary arrow V in FIG. 2b). Noise-developing bearing play is thus prevented between the outer ring 1 and the pivot ring 6.

The spring elements described can also be provided several times and/or combined with each other. It is conceivable, for example, to provide a spring load by means of a compression spring, as is shown in FIG. 4, in addition to a spring load by means of a spring washer, as is shown in FIGS. 3a/b. Other combinations or variants are also conceivable. For example, the compression spring can also be integrated in an adjusting or threaded ring 6 {see FIG. 2).

in summary, a mounting is proposed, which is provided for a worm in a steering gear which meshes with a worm gear. The mounting comprises at least one first bearing, which is preferably designed as a fixed bearing. This bearing substantially comprises an outer ring, an inner ring, and rolling bodies received movably between the rings and is pivotably disposed in a bearing seat, which in turn receives the outer ring of the bearing. The inner ring in turn receives one of the two shaft ends of the worm so as to mount this shaft end of the worm radially in the housing of the steering gear. For the purpose of providing improved spring load to the worm, at least one spring element is provided on the bearing, this spring element applying a spring force, which supports pivoting of the worm toward the worm gear, to a region or a location of the outer ring of the bearing.

The invention claimed is:

1. A mounting for a worm in a steering gear which meshes with a worm gear, the mounting comprising:
   a bearing which is designed as a pivot bearing and has an outer ring, an inner ring and rolling bodies received movably between the outer ring and the inner ring, the bearing being pivotably disposed in a bearing seat that receives the outer ring of the bearing, and the inner ring receiving one shaft end of two shaft ends of the worm so as to mount said one shaft end of the worm radially in a housing of the steering gear; and
   a spring element provided on the bearing, the spring element applying a spring force, which supports pivoting of the worm toward the worm gear, to a region of the outer ring of the bearing so as to provide a spring load to the worm, wherein said bearing is configured so that said region to which the spring force is applied faces along an axis of the worm in a direction toward the worm gear where the worm meshes with the worm gear.

2. The mounting according to claim 1, wherein the spring element acts on the region of the outer ring of the bearing, wherein said bearing and said spring element are located relative to the worm adjacent a portion of the worm located axially opposite to a region of the worm at which the worm meshes with the worm gear.

3. A mounting according to claim 1, wherein the spring element has an asymmetrical design, or is asymmetrically disposed in the housing, so as to act only on said region of the outer ring of the bearing.

4. A mounting according to claim 1, wherein the spring element is an annular or disk-shaped spring element.

5. The mounting according to claim 4, wherein the spring element is a tapered section retaining ring, and has a protrusion, by means of which the spring element exerts an axial spring force to the one region of the outer ring of the bearing.

6. The mounting according to claim 4, wherein the spring element is a spring washer, and has a protrusion, by means of which the spring element exerts an axial spring force to the one region of the outer ring of the bearing.

7. The mounting according to claim 6, wherein the spring washer is provided with an adjusting screw.

8. A mounting according to claim 1, wherein the spring element asymmetrically disposed in the housing is a helical compression spring.

9. The mounting according to claim 8, wherein the helical compression spring is provided with a pressure tip.

10. A mounting according to claim 1, wherein the spring element comprises a plurality of spring elements.

11. A steering gear, comprising a mounting for a worm that meshes with a worm gear, the mounting comprising:
    a bearing which is designed as a pivot bearing and has an outer ring, an inner ring and rolling bodies received movably between the outer ring and the inner ring, the bearing being pivotably disposed in a bearing seat that receives the outer ring of the bearing, and the inner ring receiving one shaft end of two shaft ends of the worm so as to mount said one shaft end of the worm radially in a housing of the steering gear; and
    a spring load acting axially on the pivotable mounting of the worm wherein a spring element is provided on the bearing designed as a pivot bearing, the spring element applying a spring force, which supports pivoting of the worm toward the worm gear, to a region of the outer ring of the bearing so as to provide a spring load to the worm, wherein said bearing is configured so that said region to which the spring force is applied faces along an axis of the worm in a direction toward the worm gear where the worm meshes with the worm gear.

12. A power steering system comprising a steering gear which has a mounting for a worm that meshes with a worm gear, the mounting comprising:
    a bearing which is designed as a pivot bearing and has an outer ring, an inner ring and rolling bodies received movably between the outer ring and inner ring, the bearing being pivotably disposed in a bearing seat that receives the outer ring of the bearing, and the inner ring receiving one shaft end of two shaft ends of the worm so as to mount said one shaft end of the worm radially in the housing of the steering gear; and
    a spring load acting axially on the pivotable mounting of the worm wherein a spring element is provided on the bearing designed as a pivot bearing, the spring element applying a spring force, which supports pivoting of the worm toward the worm gear, to a region of the outer ring of the bearing so as to provide a spring load to the worm, wherein said bearing is configured so that said region to which the spring force is applied faces along an axis of the worm in a direction toward the worm gear where the worm meshes with the worm gear.

13. The mounting according to claim 1, wherein said bearing is configured so that a pivot axis is formed for pivoting the worm toward the worm gear.

* * * * *